Aug. 20, 1940.    A. R. SWANSON    2,212,309

SPOOL CONSTRUCTION

Filed July 25, 1938

INVENTOR
ALVERN R. SWANSON
BY
HARRIS, KIECH, FOSTER & HARRIS

*Clarence F. Kiech*
FOR THE FIRM
ATTORNEYS.

Patented Aug. 20, 1940

2,212,309

UNITED STATES PATENT OFFICE 2,212,309

SPOOL CONSTRUCTION

Alvern R. Swanson, Los Angeles, Calif.

Application July 25, 1938, Serial No. 221,080

5 Claims. (Cl. 242—70)

My invention relates to devices for handling, storing, and transporting elongated material, and is directed to an improved form of spool for such material.

My invention is broadly applicable to the problems of handling all forms of elongated material, including filamentous material such as thread, string, rope, and wire, and including sheet-like material such as textiles, paper, and the like in various widths. Since my invention may be applied with striking advantages to the problems of handling and storing motion picture film, I elect, for the purposes of disclosure and illustration, to describe my invention as applied specifically to reels, spools, hubs, or the like employed on motion picture film equipment and utilized for handling, storing and shipping such film, but it is to be understood that my invention may be embodied in other devices for similar purposes outside of the motion picture art.

Various types of reels, spools, and hubs serving as spools are employed on such film equipment as winders, rewinders, developing machines, printing machines, cameras, projectors, and are also employed for storing and transporting motion picture film. Ordinarily, such spooling devices are keyed on spindles or shafts of various equipment for winding and unwinding film and are removed bodily from such equipment for storing or transporting the film. In one practice, such a spool comprises a solid hub member adapted to be keyed to a spindle or shaft of film-operating equipment and to be removably retained thereon, for example by a washer and a nut in engagement with the spindle or shaft. The mounting or dismounting of such a hub involves appreciable time and labor and an inventory of such devices tied up in storage and transportation usually represents a considerable capital investment.

One general object of my invention is to obviate the necessary of mounting and dismounting hubs on spindles and shafts of motion picture equipment. Another general object in mind is to obviate the necessity of employing relatively expensive hub structures for storing and transporting motion picture film. These objects are attained in a new method of handling motion picture film, that has for its purpose the saving of time and labor and the saving of investment in storage equipment.

More specifically stated, the general object of my invention is to provide a spool construction comprising a hub adapted to be permanently mounted on a shaft or spindle in combination with a sleeve for wound film that is adapted to be removably mounted on the hub, my conception being that such sleeves themselves shall constitute spool elements for interchangeable mounting on the complementary hubs of various film equipment.

In the preferred form of the invention, one of my objects is to provide a split sleeve for spooling film, the ends of which split sleeve are adapted to engage the film. More specifically, the preferred forms of my invention are characterized by the conception of a split sleeve with its opposed ends disposed to serve as jaws for gripping the film. With reference to this conception, one of my objects is to provide such a split spool in which the jaws are responsive to the constrictive pressure of material wound on the spool; and a further specific object is to provide such a split sleeve that will have a freely sliding fit on the complementary hub regardless of any constrictive effect of material wound on the sleeve.

Other objects of my invention refer to the manner in which such a sleeve is mechanically related to its complementary hub. My general object in this respect is to provide a sleeve that may be mounted on the hub or removed therefrom by a single simple movement, yet is adapted to cooperate with the hub in an efficient manner. My invention contemplates a simple sheet metal sleeve that may be mounted on the hub by a sliding movement axially of the hub and when so mounted will be nonrotatably engaged with the hub. In the preferred form of my invention I propose to employ a sheet metal band for the sleeve and to flange the ends of the band inward for the dual purpose of providing jaws to grip the film and of providing means to cooperate with a peripheral recess in the hub to prevent relative rotation between the hub and sleeve.

Still further objects and advantages of my invention relate to the method of manufacturing such a sleeve, as will be subsequently discussed in detail.

The above and other objects of my invention will be apparent in my detailed description to follow taken with the accompanying drawing.

Figure 2:
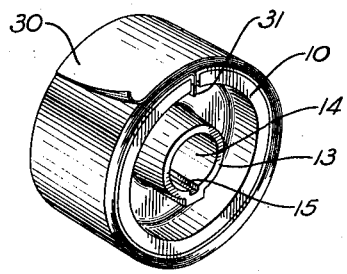
Fig. 2 is a perspective view on a somewhat reduced scale of such a sleeve wound with film and mounted on an isolated hub.

The hub generally designated by the numeral 10 in the drawing is of a well-known type adapted to be mounted on a member 11 which represents a spindle or shaft of any motion picture film equipment. The nave 13 of the hub member has the usual axial bore 14 to embrace the spindle 11, which bore is provided with the usual key-seat 15.

Figure 3:
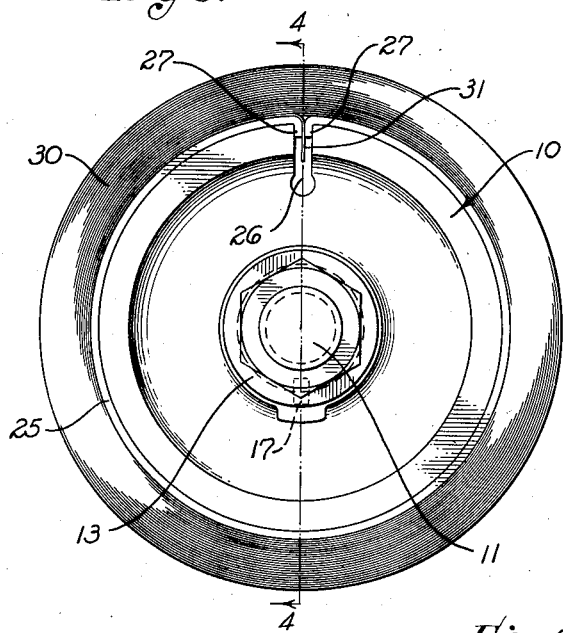
Fig. 3 is an end view on an enlarged scale of a hub mounted on a spindle and carrying a split sleeve wound with film.
Figure 4:
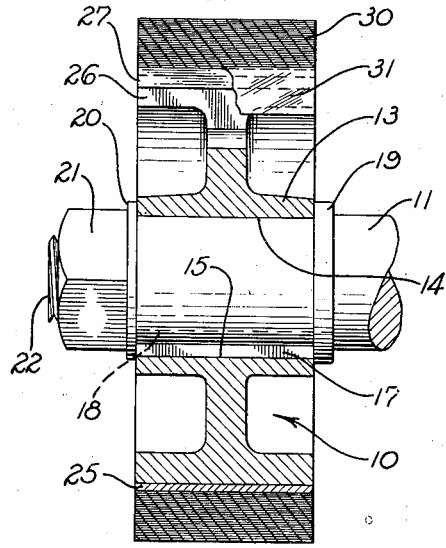
Fig. 4 is an axial section taken along the line 4—4 of Fig. 3.

Figs. 3 and 4 show the typical manner in which such a hub may be mounted on the spindle 11. A key 17 is shown seated in the key-seat 15 and in a complementary key-seat 18 cut in the spindle. The hub 10 rests against a shoulder or flange 19 of the spindle and is held thereagainst by an outer washer 20 and a nut 21 engaging the outer threaded end 22 of the spindle.

It is apparent that my hub member may be of any conventional construction so long as it provides a suitable periphery for removably retaining a sleeve member such as a split sleeve 25, and may differ from the ordinary hub or pulley only in providing means for retaining such a sleeve or for preventing relative rotation of such a sleeve. For example, in the preferred form of my invention shown in the drawing, the hub 10 differs from a conventional hub member or spool only in having a peripheral slot or recess 26 to cooperate with the split sleeve 25.

The split sleeve 25 may be a simple sheet metal band of suitable dimensions. By preference, however, I arrange the ends of the band to serve as jaws for gripping the end of the film. In the preferred form of my invention the two ends of the band are simply flanged radially inward, as shown at 27, to provide substantial end surfaces for frictional contact with the end of the film and additionally to provide means for positive engagement with the recess 26 of the hub.

The manner in which such a split sleeve may be used in cooperation with the hub as well as apart from the hub will be apparent from my foregoing discussion. Prior to winding a length of film 30 on the sleeve, an end 31 of the film is inserted between the jaws provided by the ends of the split sleeve. In one practice, the split sleeve is formed with a certain degree of inherent resiliency to cause the jaws normally to press against each other. In an alternative practice, the normal unrestrained disposition of the sleeve provides sufficient spacing between the jaws to receive the end of the film without the necessity of spreading the jaws apart. In either case a feature of my invention is that the subsequent winding of the film on such a split sleeve exerts pressure tending to constrict the sleeve, which pressure is transmitted into pressure of the ends of the split sleeve against the interposed material of the film. The film will usually be wound with the split sleeve in the assembled position shown in Figs. 3 and 4, but it is important to note that the split sleeve is so dimensioned that the constrictive effect of the wound film will not cause the split sleeve to bind on the hub or to embrace the hub so tightly as to interfere with removal of the split sleeve in an axial direction. It is apparent that the sleeve may be mounted on the hub or removed therefrom with substantially no effort or loss of time, and that only the relatively inexpensive split sleeve need accompany the film to storage or in transportation. Since the sleeves are interchangeable with respect to the hubs, they may be used with the same freedom as any spool or reel heretofore employed in the art.

Figure 5:
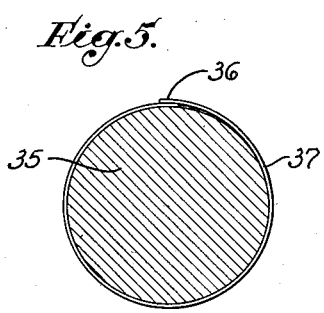
Fig. 5 is a sectional view on a somewhat reduced scale of a mandrel embraced by a sheet metal band in an early stage of manufacturing the split sleeve.

In the preferred form of manufacturing my split sleeve, I cut a sheet metal band to proper dimensions and then roll the sheet metal band into a ring preferably of slightly less diameter than the desired finished diameter. In so forming the band into a ring, I may employ a roll or a mandrel 35 as shown in Fig. 5. It will be noted that the ends 36 of the sheet metal band 37 at this stage in my process are in overlapping relationship.

Figure 6:
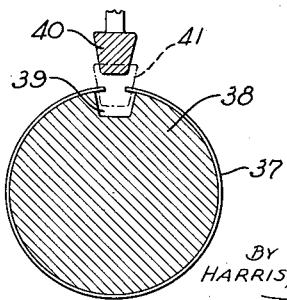
Fig. 6 is a similar view of a second mandrel and cooperating flanging tool employed at a later stage in the process of manufacturing such a split sleeve.

In the subsequent steps of my process, I expand the sheet metal band 37 for the purpose of separating the two ends 36 preparatory to flanging those ends, but I may be careful not to exceed the elastic limits of the formed band so that the band when subsequently released will tend to return to the diameter shown in Fig. 5. For expanding the band 37 and holding it so expanded in a convenient manner during the flanging operation, I may employ a mandrel 38 of the cross-sectional configuration indicated in Fig. 6. This mandrel may be somewhat conical to favor placing the ring thereon or may be of simple cylindrical configuration.

Figure 1:
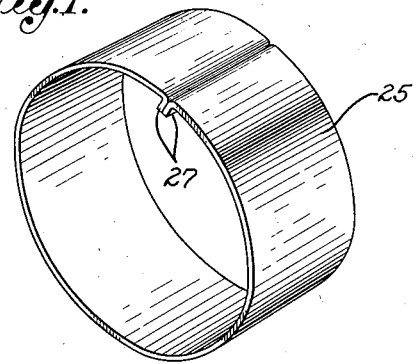
Fig. 1 is a perspective view of a split sleeve constructed in accordance with my invention.

The mandrel is provided with a longitudinal peripheral recess 39 to cooperate in the operation of forming flanges on the ends of the band, the dimensions of the recess and the mandrel determining the finished diameter and circumference of the band. The forming of the end flanges on the band may be accomplished simply by moving a suitable die 40 into the recess, the inner position of the die being indicated by dotted lines at 41 in Fig. 6. After the end flanges are formed, the die 40 is retracted and the finished article is removed from the mandrel 38. When so removed, the split ring contracts to the configuration indicated in Fig. 1. This method of manufacture is relatively simple, but provides the required degree of accuracy.

My description of the preferred form of my invention for the purpose of this disclosure and to illustrate the principles involved will suggest to those skilled in the art various changes and modifications that do not depart from the spirit of my conception. I reserve the right to all such changes and modifications that properly come within the scope of my appended claims.

I claim as my invention:

1. A spool for a ribbon of material, including: a hub having a cylindrical peripheral surface; and a circular band complementary to said hub adapted for removable mounting thereon in engagement therewith, said circular band being adapted to be wound with said ribbon, said band having two ends adjacent to and opposed to each other to grip an end of the ribbon, said ends being movable together and apart by circumferential contraction and expansion of the band, said hub being sufficiently smaller in diameter than said band to permit said ends under constrictive pressure of the wound ribbon to grip and retain the end of the ribbon by friction alone without rupturing the ribbon while the band is on the hub, and to permit the constricted band to be readily slipped on and off the hub.

2. A spool for a ribbon of material, including:

a hub having a cylindrical peripheral surface; and a circular band complementary to said hub adapted for removable mounting thereon in engagement therewith, said circular band being adapted to be wound with said ribbon, said band having two ends adjacent to and opposed to each other to grip an end of the ribbon, said ends being movable together and apart by circumferential contraction and expansion of the band, said hub being sufficiently smaller in diameter than said band to permit said ends under constrictive pressure of the wound ribbon to grip and retain the end of the ribbon by friction alone without rupturing the ribbon while the band is on the hub, and to permit the constricted band to be readily slipped on and off the hub, said band having an inherent tendency to close said ends together for initial engagement with a ribbon preliminary to winding of the ribbon on the band.

3. A spool for a ribbon of material, including: a hub having a recess in its periphery; a circular band complementary to the hub adapted for removable mounting thereon, said band having two end portions adjacent to each other, said band being adapted to receive said ribbon wound thereon; and two inwardly directed flanges on said end portions respectively of the band, said flanges forming opposed faces for gripping an end of said ribbon, said flanges being dimensioned to enter said recess to prevent rotation of the band relative to said hub, said flanges being movable together and apart by contraction and expansion of the ring, said hub being sufficiently smaller in diameter than said band to permit said flanges under constrictive pressure of the wound ribbon to grip and retain the end of the ribbon in a non-slipping manner without piercing the ribbon, and to permit the constricted band to be readily slipped on and off the hub.

4. A spool for a ribbon of material, including: a hub having a recess in its periphery; a circular band complementary to the hub adapted for removable mounting thereon, said band having two end portions adjacent to each other, said band being adapted to receive said ribbon wound thereon; and two inwardly directed flanges on said end portions respectively of the band, said flanges forming opposed faces for gripping an end of said ribbon, said flanges being dimensioned to enter said recess to prevent rotation of the band relative to said hub, said flanges being movable together and apart by contraction and expansion of the ring, said hub being sufficiently smaller in diameter than said band to permit said flanges under constrictive pressure of the wound ribbon to grip and retain the end of the ribbon in a non-slipping manner without piercing the ribbon, and to permit the constricted band to be readily slipped on and off the hub, said band being resilient and having an inherent tendency to close said flanges together with sufficient pressure for initial engagement with a ribbon prior to winding of the ribbon on said band.

5. A spool for a ribbon of material, including: a hub having a recess in its periphery; a circular band complementary to the hub adapted for removable mounting thereon, said band having two end portions adjacent to each other, said band being adapted to receive said ribbon wound thereon; and two inwardly directed flanges on said end portions respectively of the band, said flanges forming opposed faces for gripping an end of said ribbon, said flanges being dimensioned to enter said recess to prevent rotation of the band relative to said hub, said flanges being movable together and apart by contraction and expansion of the ring, said hub being sufficiently smaller in diameter than said band to permit said flanges under constrictive pressure of the wound ribbon to grip and retain the end of the ribbon in a non-slipping manner without piercing the ribbon, said band being adapted automatically to expand sufficiently to permit release of said ribbon end upon cessation of said constrictive pressure by the wound ribbon.

ALVERN R. SWANSON.